(12) United States Patent
Smith et al.

(10) Patent No.: US 10,176,355 B2
(45) Date of Patent: Jan. 8, 2019

(54) OPTICAL SENSOR FOR INTEGRATION IN A DISPLAY

(71) Applicant: Synaptics Incorporated, San Jose, CA (US)

(72) Inventors: Patrick Smith, San Jose, CA (US); Arash Akhavan Fomani, Saratoga, CA (US); Marek Mienko, San Jose, CA (US); Paul Wickboldt, Walnut Creek, CA (US)

(73) Assignee: Synaptics Incorporated, San Jose, CA (US)

( * ) Notice: Subject to any disclaimer, the term of this patent is extended or adjusted under 35 U.S.C. 154(b) by 346 days.

(21) Appl. No.: 15/087,955

(22) Filed: Mar. 31, 2016

(65) Prior Publication Data

US 2017/0161543 A1    Jun. 8, 2017

Related U.S. Application Data

(60) Provisional application No. 62/262,863, filed on Dec. 3, 2015.

(51) Int. Cl.
*G06K 9/00* (2006.01)
*G02F 1/1333* (2006.01)
(Continued)

(52) U.S. Cl.
CPC ..... *G06K 9/00013* (2013.01); *G02F 1/13338* (2013.01); *G06K 9/0004* (2013.01);
(Continued)

(58) Field of Classification Search
CPC .......... G01J 1/0214; G01J 1/0233; G01J 1/04; G01J 1/0407; G01J 1/0411; G01J 1/0414;
(Continued)

(56) References Cited

U.S. PATENT DOCUMENTS 5,446,290 A    8/1995  Fujieda et al.
5,726,443 A    3/1998  Immega et al.
(Continued)

FOREIGN PATENT DOCUMENTS

CN    101814125 A    8/2010
CN    101814126 B    8/2010
(Continued)

OTHER PUBLICATIONS

International Search Report and Written Opinion issued in PCT/US2016/064148 dated Feb. 14, 2017.
(Continued)

*Primary Examiner* — Westley J Tucker
(74) *Attorney, Agent, or Firm* — Leydig, Voit & Mayer, Ltd.

(57) ABSTRACT

Systems and methods for optical imaging are disclosed. An optical sensor for imaging a biometric input object on a sensing region includes a transparent layer having a first side and a second side opposite the first side; a first set of apertures disposed above the first side of the transparent layer; a reflective layer disposed below the second side of transparent layer configured to receive light transmitted through the first set of apertures and to reflect the received light; and a plurality of detector elements positioned to detect the reflected light.

23 Claims, 13 Drawing Sheets

(51) Int. Cl.
    *G02F 1/133* (2006.01)
    *G02F 1/1335* (2006.01)
    *G02F 1/1368* (2006.01)

(52) U.S. Cl.
    CPC .......... *G06K 9/0008* (2013.01); *G02F 1/1368* (2013.01); *G02F 1/13318* (2013.01); *G02F 1/133512* (2013.01); *G02F 1/133514* (2013.01); *G02F 1/133528* (2013.01); *G02F 1/133536* (2013.01); *G06K 2009/0006* (2013.01)

(58) Field of Classification Search
    CPC ...... G01J 1/0422; G01J 1/0429; G01J 1/0437; G01J 1/0488; G01J 1/0492; G01J 1/06; G01J 1/08; G02F 1/3338; G02F 1/33512; G06K 9/0004; G06K 9/0008
    See application file for complete search history.

(56) References Cited

U.S. PATENT DOCUMENTS

| | | |
|---|---|---|
| 5,991,467 A | 11/1999 | Kamiko |
| 6,128,399 A | 10/2000 | Calmel |
| 7,212,279 B1 | 5/2007 | Feng |
| 7,465,914 B2 | 12/2008 | Eliasson et al. |
| 7,535,468 B2 | 5/2009 | Uy |
| 7,728,959 B2 | 6/2010 | Waldman et al. |
| 7,969,422 B2 | 6/2011 | Gruhlke |
| 8,204,283 B2 | 6/2012 | Wu |
| 8,204,284 B2 | 6/2012 | Wu |
| 8,259,168 B2 | 9/2012 | Wu et al. |
| 8,391,569 B2 | 3/2013 | Wu |
| 8,487,913 B2 | 7/2013 | Tsuda |
| 8,520,912 B2 | 8/2013 | Wu et al. |
| 8,570,303 B2 | 10/2013 | Chen |
| 8,649,001 B2 | 2/2014 | Wu et al. |
| 8,798,337 B2 | 8/2014 | Lei et al. |
| 8,903,140 B2 | 12/2014 | Wu |
| 8,917,387 B1 | 12/2014 | Lee et al. |
| 8,921,473 B1 | 12/2014 | Hyman |
| 9,177,190 B1 | 11/2015 | Chou et al. |
| 9,208,394 B2 | 12/2015 | Di Venuto Dayer et al. |
| 9,829,614 B2 * | 11/2017 | Smith .................... G02B 27/58 |
| 9,934,418 B2 | 4/2018 | Mienko et al. |
| 10,019,615 B2 | 7/2018 | Wu |
| 2001/0050765 A1 | 12/2001 | Antonelli et al. |
| 2004/0208346 A1 | 10/2004 | Baharav et al. |
| 2004/0252867 A1 | 12/2004 | Lan et al. |
| 2005/0036665 A1 | 2/2005 | Higuchi |
| 2005/0157914 A1 | 7/2005 | Kim et al. |
| 2005/0243055 A1 | 11/2005 | Ranta et al. |
| 2007/0222998 A1 | 9/2007 | Sasaki et al. |
| 2008/0025579 A1 | 1/2008 | Sidlauskas et al. |
| 2008/0121442 A1 | 5/2008 | Boer et al. |
| 2008/0122803 A1 | 5/2008 | Izadi et al. |
| 2008/0239285 A1 | 10/2008 | Wang et al. |
| 2010/0067757 A1 | 3/2010 | Arai et al. |
| 2010/0172552 A1 | 7/2010 | Wu |
| 2010/0183200 A1 | 7/2010 | Wu |
| 2010/0208952 A1 | 8/2010 | Wu |
| 2010/0208954 A1 | 8/2010 | Wu |
| 2010/0283756 A1 | 11/2010 | Ku et al. |
| 2010/0309169 A1 | 12/2010 | Lieberman et al. |
| 2011/0122071 A1 | 5/2011 | Powell |
| 2011/0233383 A1 | 9/2011 | Oku |
| 2011/0254809 A1 | 10/2011 | Yu et al. |
| 2011/0298753 A1 | 12/2011 | Chuang et al. |
| 2012/0026093 A1 | 2/2012 | Duparre et al. |
| 2012/0076370 A1 | 3/2012 | Lei et al. |
| 2012/0086672 A1 | 4/2012 | Tseng et al. |
| 2012/0105614 A1 | 5/2012 | Wu et al. |
| 2012/0133624 A1 | 5/2012 | Castagner et al. |
| 2012/0241825 A1 | 9/2012 | Aichi |
| 2012/0321149 A1 | 12/2012 | Carver et al. |
| 2012/0328170 A1 | 12/2012 | Wu et al. |
| 2013/0034274 A1 | 2/2013 | Wu et al. |
| 2013/0051635 A1 | 2/2013 | Wu et al. |
| 2013/0119237 A1 * | 5/2013 | Raguin .............. H01L 27/14601 250/208.1 |
| 2013/0120760 A1 | 5/2013 | Raguin et al. |
| 2013/0169780 A1 | 7/2013 | Wu |
| 2013/0222282 A1 | 8/2013 | Huang et al. |
| 2014/0125788 A1 | 5/2014 | Wu |
| 2014/0218327 A1 | 8/2014 | Shi et al. |
| 2014/0354596 A1 | 12/2014 | Djordjev et al. |
| 2014/0355846 A1 | 12/2014 | Lee et al. |
| 2015/0035799 A1 | 2/2015 | Lin et al. |
| 2015/0036065 A1 | 2/2015 | Yousefpor et al. |
| 2015/0062088 A1 | 3/2015 | Cho et al. |
| 2015/0078633 A1 | 3/2015 | Hung |
| 2015/0084994 A1 | 3/2015 | Wyrwas et al. |
| 2015/0242056 A1 | 8/2015 | Hoffman |
| 2015/0331508 A1 | 11/2015 | Nho et al. |
| 2015/0347812 A1 | 12/2015 | Lin |
| 2015/0347813 A1 | 12/2015 | Tsen |
| 2015/0369661 A1 | 12/2015 | Lin |
| 2015/0371074 A1 | 12/2015 | Lin |
| 2015/0371075 A1 | 12/2015 | Lin |
| 2016/0110025 A1 | 4/2016 | Hossu |
| 2016/0247010 A1 | 8/2016 | Huang et al. |
| 2017/0017824 A1 | 1/2017 | Smith et al. |
| 2017/0161544 A1 * | 6/2017 | Fonnani ................ G01J 1/0214 |
| 2017/0220838 A1 * | 8/2017 | He ....................... G06K 9/0004 |
| 2017/0220844 A1 | 8/2017 | Jones et al. |

FOREIGN PATENT DOCUMENTS

| | | |
|---|---|---|
| CN | 102467660 A | 5/2012 |
| CN | 102682280 A | 9/2012 |
| CN | 202443032 U | 9/2012 |
| CN | 102842026 A | 12/2012 |
| CN | 202632318 U | 12/2012 |
| CN | 102915430 A | 2/2013 |
| CN | 102955936 A | 3/2013 |
| CN | 101814126 A | 4/2013 |
| CN | 102682280 B | 6/2013 |
| CN | 103198289 A | 7/2013 |
| CN | 102467660 B | 11/2013 |
| CN | 103810483 A | 5/2014 |
| CN | 103942537 A | 7/2014 |
| CN | 104035620 A | 9/2014 |
| CN | 104063704 A | 9/2014 |
| CN | 203838722 U | 9/2014 |
| CN | 104182727 A | 12/2014 |
| CN | 204028936 U | 12/2014 |
| CN | 104463074 A | 3/2015 |
| CN | 102915430 B | 8/2015 |
| CN | 102842026 B | 9/2015 |
| CN | 102955936 B | 9/2015 |
| EP | 2437201 A2 | 4/2012 |
| EP | 2437201 A3 | 4/2012 |
| EP | 2447883 A1 | 5/2012 |
| EP | 2555137 A1 | 2/2013 |
| EP | 2562683 A1 | 2/2013 |
| JP | 2009-163408 A1 | 10/2009 |
| JP | 3177550 U | 8/2012 |
| KR | 1020040034776 A | 4/2004 |
| KR | 20120003165 U | 5/2012 |
| KR | 200462271 Y1 | 9/2012 |
| KR | 20130016023 A | 2/2013 |
| KR | 20130022364 A | 3/2013 |
| KR | 101259310 B1 | 5/2013 |
| KR | 101307002 B1 | 9/2013 |
| TW | 201214303 A1 | 4/2010 |
| TW | 201027436 A1 | 7/2010 |
| TW | 201032145 A1 | 9/2010 |
| TW | 201115479 A1 | 5/2011 |
| TW | 201301144 A1 | 1/2013 |
| TW | I382349 B1 | 1/2013 |
| TW | I382350 B1 | 1/2013 |
| TW | I450201 B | 2/2013 |
| TW | 201310353 A1 | 3/2013 |
| TW | 201329872 A1 | 7/2013 |

(56) References Cited

FOREIGN PATENT DOCUMENTS

| TW | 201419165 A | 5/2014 |
|---|---|---|
| TW | I444904 B | 7/2014 |
| TW | I448973 B | 8/2014 |
| TW | I457842 B | 10/2014 |
| TW | 201441940 A | 11/2014 |
| TW | I456510 B | 12/2014 |
| TW | 201308215 A1 | 2/2015 |
| TW | 201506807 A | 2/2015 |
| WO | M435680 U1 | 2/2012 |
| WO | WO 2015/041459 A1 | 3/2015 |
| WO | WO 2015/140600 A1 | 9/2015 |
| WO | WO 2016/119492 A1 | 8/2016 |

OTHER PUBLICATIONS

International Search Report and Written Opinion issued in PCT/US2016/064174 dated Feb. 13, 2017.
Rowe et al. "Multispectral Fingerprint Image Acquisition" Springer, New York, USA, 2008 pp. 3-23.
VKANSEE Presentation prior to Sep. 30, 2015.
Cho, et al, "Embedded Nano-Si Optical Sensor in TFT-LCDs Technology and Integrated as Touch-Input Display" *Digest of Technical Papers*. vol. 42. No. 1., 2011, pp. 1818-1821.
Brown, et al., "A Continuous-Grain Silicon-System LCD With Optical Input Function" IEEE Journal of Solid-State Circuits, Dec. 12, 2007, vol. 42.
Atpina Technology White Paper "An Objective Look at FSI and BSI" May 18, 2010, 6 pages.
Durini, "High Performance Silicon Imaging: Fundamentals and Applications of CMOS and CCD Sensors" *Woodhead Publishing Series in Electronic and Optical Materials* 1$^{st}$ edition; May 8, 2014, pp. 98-107.
U.S. Appl. No. 15/087,785, filed Mar. 31, 2016.
U.S. Appl. No. 15/087,971, filed Mar. 31, 2016.
U.S. Appl. No. 15/944,591, filed Apr. 3, 2018.
International Search Report and Written Opinion for PCT/US2016/064103, dated Feb. 13, 2017.

* cited by examiner

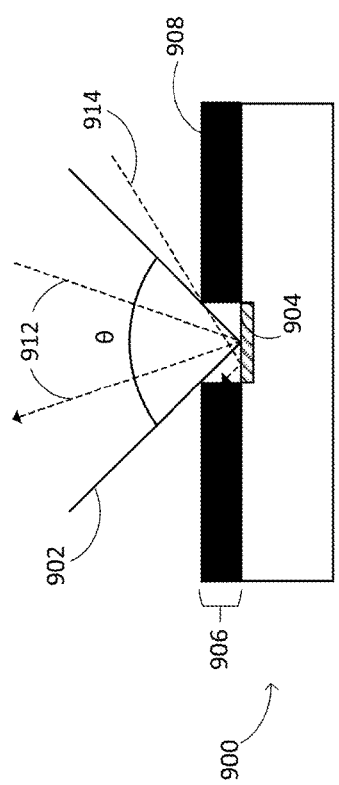
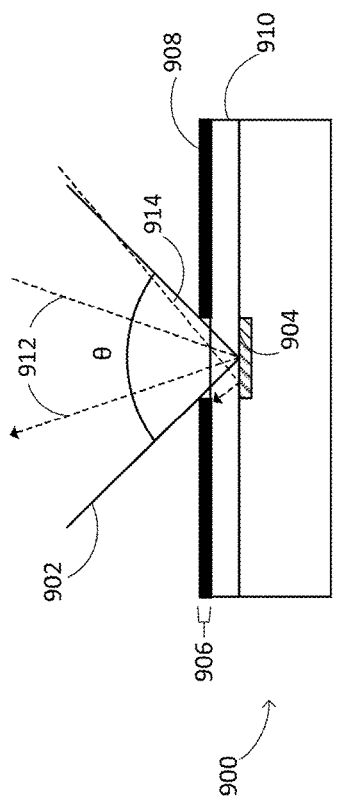
FIG. 9A
FIG. 9B

OPTICAL SENSOR FOR INTEGRATION IN A DISPLAY

CROSS REFERENCE TO RELATED APPLICATIONS

This application claims the benefit of U.S. Provisional Patent Application Ser. No. 62/262,863, entitled "Display Integrated Optical Fingerprint Sensor with Transparent Layer," filed Dec. 3, 2015, the entire contents of which are expressly incorporated by reference.

This application is further related to U.S. patent application Ser. No. 15/087,785, entitled "Display Integrated Optical Fingerprint Sensor with Angle Limiting Reflector" and U.S. patent application Ser. No. 15/087,971, entitled "Optical Sensor for Integration Over a Display Backplane," both filed on Mar. 31, 2016, the entire contents of which are expressly incorporated by reference.

FIELD

This disclosure generally relates to optical sensors, and more particularly to an optical sensor which may be integrated into a display stack.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes. Various types of sensors may be used for biometric imaging.

Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require recognition systems that are both small in size and highly reliable.

Most commercially available fingerprint sensors are based on optical or capacitive sensing technologies. Solutions using optical fingerprint sensors usually require an optical element to condition light before the light reaches the sensor elements. Unfortunately, it remains challenging to fit conventional optical elements into the limited height available in relatively small spaces, such as found in a display stack of an electronic device. Further, implementations with light conditioning structures at or above an active display matrix involve a trade-off between cover layer thickness, image blurring and image quality preventing practical product implementation.

As a result, fingerprint sensors in most mobile devices are capacitive sensors having a sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each sensing element in the array varies depending on whether a ridge or valley is present, and these variations are electrically detected to form an image of the fingerprint.

While capacitive fingerprint sensors provide certain advantages, most commercially available capacitive fingerprint sensors have difficulty sensing fine ridge and valley features through large distances, requiring the fingerprint to contact a sensing surface that is close to the sensing array. It remains a significant challenge for a capacitive sensor to detect fingerprints through thick layers, such as the thick cover glass (sometimes referred to herein as a "cover lens") that protects the display of many smart phones and other mobile devices. To address this issue, a cutout is often formed in the cover glass in an area beside the display, and a discrete capacitive fingerprint sensor (often integrated with a mechanical button) is placed in the cutout area so that it can detect fingerprints without having to sense through the cover glass. The need for a cutout makes it difficult to form a flush surface on the face of device, detracting from the user experience, and complicating the manufacture. The existence of mechanical buttons also takes up valuable device real estate.

SUMMARY

One embodiment of the disclosure provides an optical sensor for imaging a biometric input object on a sensing region. The optical sensor includes a transparent layer having a first side and a second side opposite the first side; a first set of apertures disposed above the first side of the transparent layer; a reflective layer disposed below the second side of transparent layer configured to receive light transmitted through the first set of apertures and to reflect the received light; and a plurality of detector elements positioned to detect the reflected light.

Another embodiment of the disclosure provides a display for imaging a biometric input object. The display includes a set of display pixels; a light blocking layer having a first set of apertures; a transparent layer positioned below the display pixels and the first set of apertures; a reflective layer positioned below the transparent layer configured to receive light transmitted through the first set of apertures and to reflect the received light; and a set of detector elements positioned to detect the reflected light.

Another embodiment of the disclosure provides a method for making an optical fingerprint sensor. The method includes forming a light blocking layer above a first side of a first transparent layer, the light blocking layer having a first set of apertures configured to permit transmission of light therethrough; forming a reflective layer below a second side of the first transparent layer opposite to the first side of the first transparent layer, the reflective layer positioned to reflect the light transmitted through the first set of apertures; and forming a detector layer having a plurality of detector elements positioned to receive the light transmitted through the first set of apertures and reflected from the reflective layer.

BRIEF DESCRIPTION OF THE DRAWINGS

FIGS. 9A-9B illustrate examples of reflective layers according to different embodiments.

DETAILED DESCRIPTION

The following detailed description is exemplary in nature and is not intended to limit the disclosure or the application and uses of the disclosure. Furthermore, there is no intention to be bound by any expressed or implied theory presented in the preceding field, background, summary, brief description of the drawings, or the following detailed description.

Turning to the drawings, and as described in greater detail herein, embodiments of the disclosure provide systems and methods to optically image an input object such as a fingerprint. In particular, a system and method are described wherein an optical sensor includes one or more reflective surfaces and apertures to restrict the angle of light reaching detector elements such that the light reaching each detector element corresponds to a relatively small area on the object being imaged. The combination of apertures and reflective surfaces act as a folded collimator minimizing the thickness of the detector in a display. The disclosed embodiments avoid trade-off between cover layer thickness, image blurring, and display image quality.

Figure 1A:
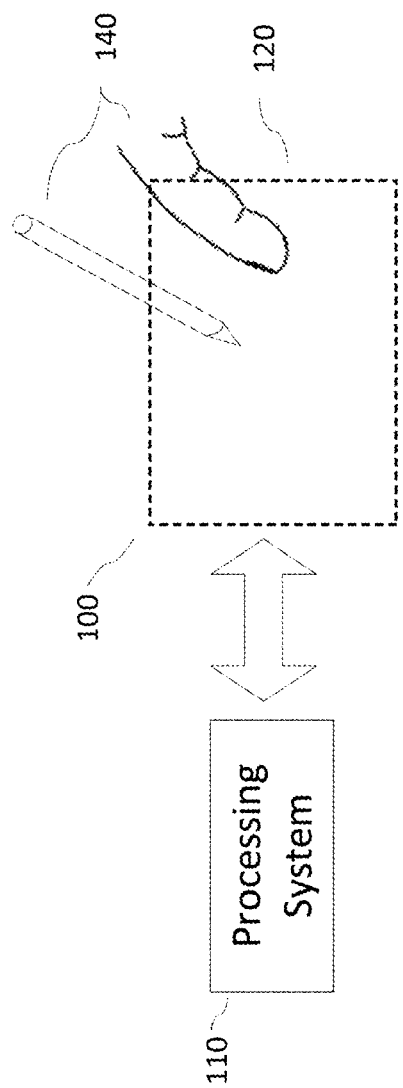
FIG. 1A is a block diagram of an example of a sensing system.

FIG. 1A is a block diagram of an exemplary sensing system having a sensor 100, in accordance with embodiments of the disclosure. The sensor 100 may be configured to provide input to an electronic system (also "electronic device"). Some non-limiting examples of electronic systems include personal computers of all sizes and shapes, such as desktop computers, laptop computers, netbook computers, tablets, e-book readers, personal digital assistants (PDAs), and wearable computers (such as smart watches and activity tracker devices). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The sensor 100 can be implemented as a physical part of the electronic system, or can be physically separate from the electronic system. In accordance with the disclosure, the sensor 100 may be integrated as part of a display of an electronic device. As appropriate, the sensor 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

The sensor 100 is configured to sense input provided by one or more input objects 140 in a sensing region 120. In one embodiment, the input object 140 is a finger, and the sensor 100 is implemented as a fingerprint sensor (also "fingerprint scanner") configured to detect fingerprint features of the input object 140. In other embodiments, the sensor 100 may be implemented as vascular sensor (e.g., for finger vein recognition), hand geometry sensor, or a proximity sensor (such as a touch pad, touch screen, and or other touch sensor device).

Sensing region 120 encompasses any space above, around, in, and/or near the sensor 100 in which the sensor 100 is able to detect input (e.g., user input provided by one or more input objects 140). The sizes, shapes, and locations of particular sensing regions may vary widely from embodiment to embodiment. In some embodiments, the sensing region 120 extends from a surface of the sensor 100 in one or more directions into space. In various embodiments, input surfaces may be provided by surfaces of casings within which sensor elements reside, by face sheets applied over the sensor elements or any casings, etc. In some embodiments, the sensing region 120 has a rectangular shape when projected onto an input surface of the input device 100.

The sensor 100 may utilize any combination of sensor components and sensing technologies to detect user input in the sensing region 120. The sensor 100 comprises one or more detector elements (or "sensing elements") for detecting user input. Some implementations utilize arrays or other regular or irregular patterns of sensing elements to detect the input object 140.

In the optical implementations of the input device 100 set forth in this disclosure, one or more detector elements detect light from the sensing region. In various embodiments, the detected light may be reflected from input objects in the sensing region, emitted by input objects in the sensing region, or some combination thereof. Example optical detector elements include photodiodes, CMOS arrays, CCD arrays, photodiodes, and other types of photosensors configured to detect light in the visible or invisible spectrum (such as infrared or ultraviolet light). The photosensors may be thin film photodetectors, such as thin film transistors (TFTs) or thin film diodes.

Some optical implementations provide illumination to the sensing region. Reflections from the sensing region in the illumination wavelength(s) are detected to determine input information corresponding to the input object.

Some optical implementations rely on principles of direct illumination of the input object, which may or may not be in contact with an input surface of the sensing region depending on the configuration. One or more light sources and/or light guiding structures may be used to direct light to the sensing region. When an input object is present, this light is reflected from surfaces of the input object, which reflections can be detect by the optical sensing elements and used to determine information about the input object.

Some optical implementations rely on principles of internal reflection to detect input objects in contact with the input surface of the sensing region. One or more light sources may be used to direct light in a transmitting medium at an angle at which it is internally reflected at the input surface of the sensing region, due to different refractive indices at opposing sides of the boundary defined by the sensing surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object. In such embodiments, the light may be directed to the input surface at an angle of incidence at which it is totally internally reflected, except where the input object is in contact with the input surface and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a ridge or valley is in contact with that portion of the input surface.

Some implementations are configured to provide images that span one, two, three, or higher dimensional spaces. The input device may have a sensor resolution that varies from embodiment to embodiment depending on factors such as the particular sensing technology involved and/or the scale of information of interest. For example, some biometric sensing implementations may be configured to detect physiological features of the input object (such as fingerprint ridge features of a finger, or blood vessel patterns of an eye), which may utilize higher sensor resolutions and present different technical considerations from some proximity sensor implementations that are configured to detect a position of the input object with respect to the sensing region (such as a touch position of a finger with respect to an input surface). In some embodiments, the sensor resolution is determined by the physical arrangement of an array of sensing elements, where smaller sensing elements and/or a smaller pitch can be used to define a higher sensor resolution.

In some embodiments, the sensor 100 is implemented as a fingerprint sensor having a sensor resolution high enough to capture features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, the fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, the fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some example imaging areas for partial placement sensors include an imaging area of 100 $mm^2$ or less. In another exemplary embodiment, a partial placement sensor has an imaging area in the range of 20-50 $mm^2$. In some implementations, the partial fingerprint sensor has an input surface that is the same size as the imaging area.

While the input device is generally described in the context of a fingerprint sensor in FIG. 1A, embodiments of the present disclosure include other biometric sensor devices. In various embodiments, a biometric sensor device may be configured to capture physiological biometric characteristics of a user. Some example physiological biometric characteristics include fingerprint patterns, vascular patterns (sometimes known as "vein patterns"), palm prints, and hand geometry.

In FIG. 1A, a processing system 110 is shown in communication with the input device 100. The processing system 110 comprises parts of or all of one or more integrated circuits (ICs) and/or other circuitry components. In some embodiments, the processing system may be configured to operate hardware of the input device to capture input data, and/or implement a biometric process or other process based on input data captured by the sensor 100.

In some implementations, the processing system 110 is configured to operate sensor hardware of the sensor 100 to detect input in the sensing region 120. In some implementations, the processing system comprises driver circuitry configured to drive signals with sensing hardware of the input device and/or receiver circuitry configured to receive signals with the sensing hardware.

For example, a processing system for an optical sensor device may comprise driver circuitry configured to drive illumination signals to one or more LEDs, an LCD backlight or other light sources, and/or receiver circuitry configured to receive signals with optical receiving elements.

In some embodiments, the processing system 110 comprises electronically-readable instructions, such as firmware code, software code, and/or the like. In some embodiments, the processing system 110 includes memory for storing electronically-readable instructions and/or other data, such as reference templates for biometric recognition. The processing system 110 can be implemented as a physical part of the sensor 100, or can be physically separate from the sensor 100. The processing system 110 may communicate with parts of the sensor 100 using buses, networks, and/or other wired or wireless interconnections. In some embodiments, components composing the processing system 110 are located together, such as near sensing element(s) of the sensor 100. In other embodiments, components of processing system 110 are physically separate with one or more components close to sensing element(s) of sensor 100, and one or more components elsewhere. For example, the sensor 100 may be a peripheral coupled to a computing device, and the processing system 110 may comprise software configured to run on a central processing unit of the computing device and one or more ICs (perhaps with associated firmware) separate from the central processing unit. As another example, the sensor 100 may be physically integrated in a mobile device, and the processing system 110 may comprise circuits and/or firmware that are part of a central processing unit or other main processor of the mobile device. In some embodiments, the processing system 110 is dedicated to implementing the sensor 100. In other embodiments, the processing system 110 performs functions associated with the sensor and also performs other functions, such as operating display screens, driving haptic actuators, running an operating system (OS) for the electronic system, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include unlocking a device or otherwise changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the sensor 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, authenticate a user, and the like.

In some embodiments, the sensing region 120 of the sensor 100 overlaps at least part of an active area of a display screen, such as embodiments where the sensor 100 comprises a touch screen interface and/or biometric sensing embodiments configured to detect biometric input data over the active display area. For example, the sensor 100 may comprise substantially transparent sensor electrodes. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The display screen may also be flexible or rigid, and may be flat, curved, or have other geometries. In some embodiments, the display screen includes a glass or plastic substrate for TFT circuitry and/or other circuitry, which may be used to provide visuals and/or provide other functionality. In some embodiments, the display device includes a cover lens (sometimes referred to as a "cover glass") disposed above display circuitry which may also provide an input surface for the input device. Example cover lens materials include optically clear amorphous solids, such as chemically hardened glass, as well as optically clear crystalline structures, such as sapphire. In accordance with the disclosure, the sensor 100 and the display screen may share physical elements. For example, some embodiments may utilize some of the same electrical components for displaying visuals and for input sensing. In one embodiment, one or more display electrodes of a display device may configured for both display updating and input sensing. As another example, the display screen may be operated in part or in total by the processing system 110 in communication with the input device.

Figure 1B:
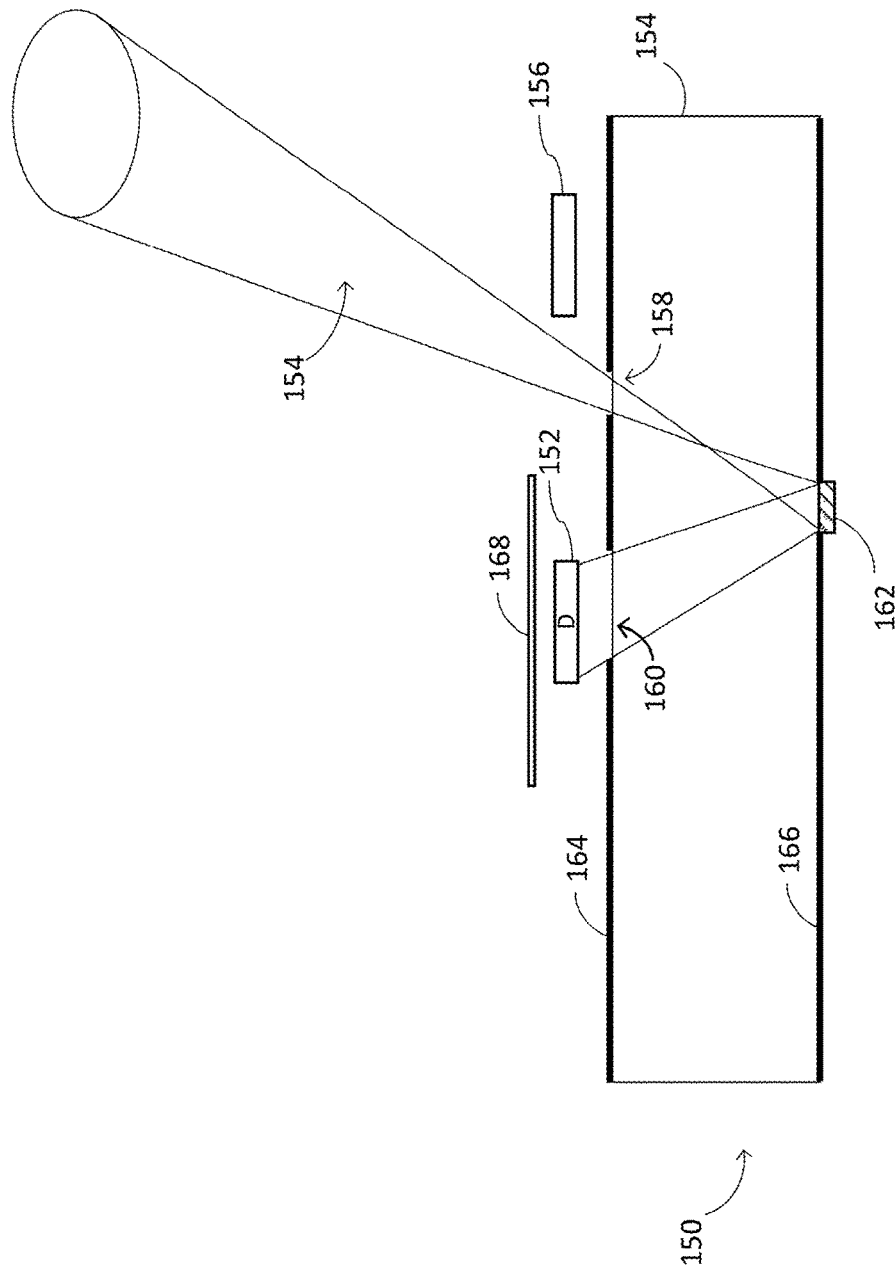
FIG. 1B is a schematic diagram of a sensor for imaging an input object, according to an embodiment.

FIG. 1B illustrates an example of an optical sensor device 150, which may be integrated in a display. The embodiment uses photo-sensor detector elements 152 to sense an image of an input object placed on or near cover glass or cover lens of the display. To reduce blurring and achieve a clear image, an optical path is formed that enables sensing of light transmitted to the underside of detector element 152 (side opposite to the sensing region that receives an input object to be imaged), as shown. The optical path is represented by an acceptance cone 154 and includes a transmission path through a transparent layer 154 below the detector elements 152 and display pixels or sub-pixels 156, and through defined apertures (e.g., 158 and 160) and which is reflected off reflective surfaces 162. These features limit the optical path to the acceptance cone of light 154 with a small acceptance angle. Also shown is blocking layer 164, which occludes light in areas not occupied by the apertures 158, 160. A light shield 168 may be placed over the detector element 152 to block stray light from above.

Maintaining a small acceptance angle, and thus minimizing blurring, is realized by the disclosed embodiments taking into account the following considerations.

First, placing the apertures, e.g. apertures 158 and 160, which at least in part define the light acceptance angle, below or up to the same plane as the display pixels 156. This arrangement minimizes adverse effects on the display appearance as compared to having extra, and potentially tall, light blocking structures above the display pixels, e.g., LCD, LED or OLED layers. Such tall structures may degrade the viewing angle and efficiency of an LCD, LED or OLED display. Instead, light blocking features are placed in or underneath the display pixels, thereby reducing their effects on optical performance of the display.

Second, placing a reflective layer 166 below the transparent layer 154 under the blocking layer 164 to increase light path length from the first to the last the stray light rejecting aperture (for example, the a and p dimensions described in connection with FIG. 3B) by folding the light path as shown. This increases the light path length to roughly double the thickness of the transparent layer 154, thereby effectively creating a folded collimator. As such, the overall height of the stray light rejection structures is reduced substantially compared to structures built entirely out of high aspect ratio apertures placed in and above a TFT layer, for example. In addition, having a longer light path length permits features and patterning (photolithography) to be used to form the apertures in the stray light rejection structure.

Accordingly, a trade-off between display image quality, sensor resolution, and cover layer thickness may be eliminated by:

1) Forming a transparent layer 154 that transmits the light to be sensed below an active matrix plane. By way of example, this layer may be formed by vacuum deposition or spinning techniques, depending on the choice of material and the desired thickness. Examples of techniques include physical vapor deposition (PVD), chemical vapor deposition (CVD), plasma enhanced CVD, liquid based depositions, spin coating, spray coating. Other methods may include, for example, various types of molding, wafer bonding, and lamination. This transparent layer may also be a display substrate itself, such as a glass, plastic or various other types of rigid or flexible substrate.

2) Forming one or more sets of apertures in a blocking layer 164 (e.g., active matrix plane) which limits the light transmitted into the transparent layer 154.

3) Forming a reflective surface 162, which may or may not be patterned, below the transparent layer 154.

4) Designing detector elements 152 so that they sense the light reflected from the reflective surface 162.

5) Designing features (1)-(4) above such that the predominant light sensed by the detector elements 152 is desired low-angle light, e.g., light from within the acceptance cone 154.

Figure 2:
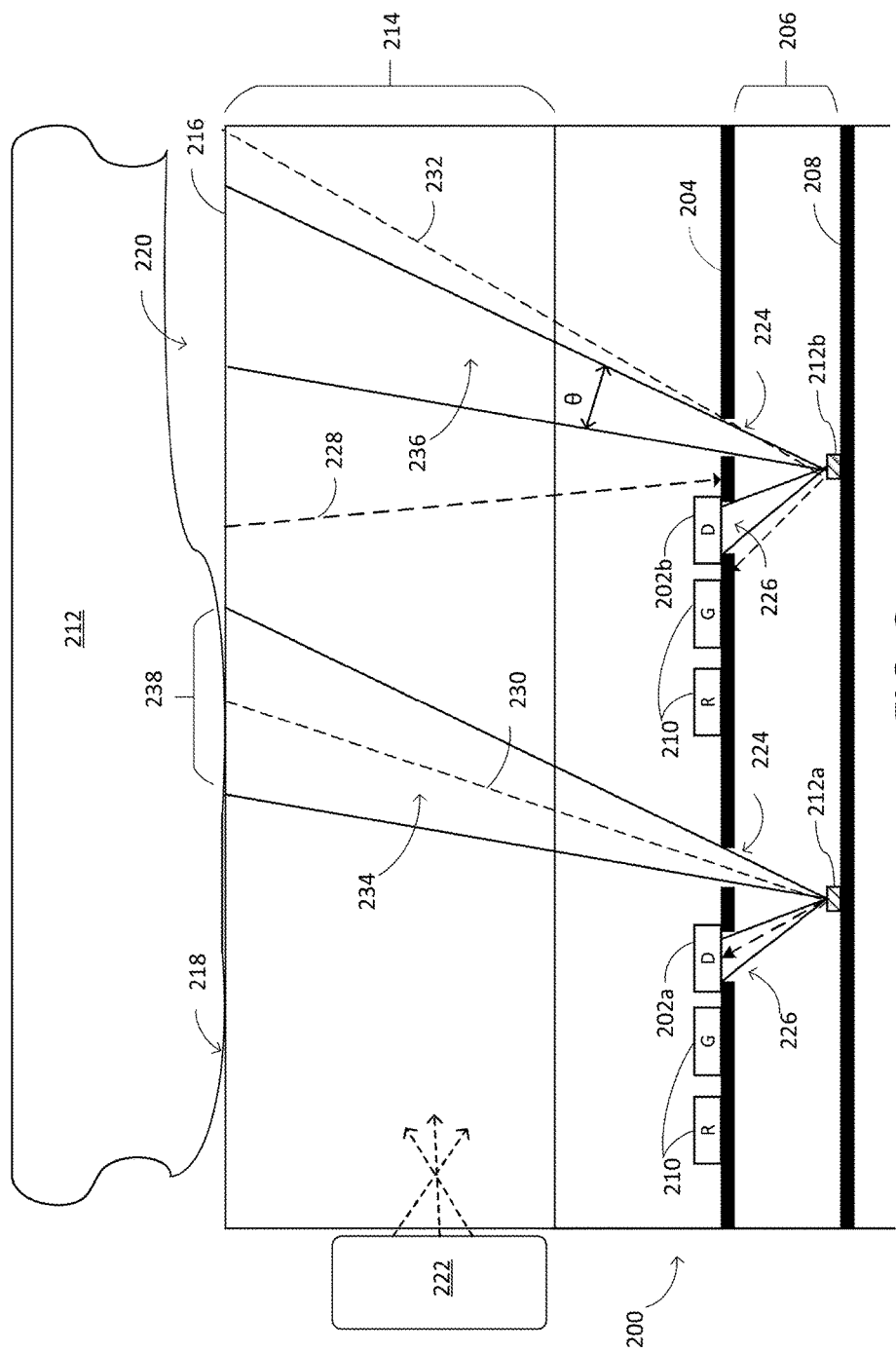
FIG. 2 illustrates an example of a sensor integrated in a display for imaging an input object, according to an embodiment.

FIG. 2 illustrates an example of an arrangement for an optical sensor device 200 integrated in a display according to an embodiment of this disclosure. The sensor 200 includes detector elements 202a, 202b (generally referenced as 202), a blocking layer 204, a transparent layer 206, and a reflecting layer 208. The sensor 200 also includes various display pixels or sub-pixels 210, which may present varying colors and are used to output an electronic graphical display visible to a user. Also shown is an input object 212, which is any object to be imaged (e.g., fingerprint). The blocking layer 204 and reflecting layer 208 form a folded optical element, with reduced thickness that minimizes or eliminates any interference with display image quality. In the example of FIG. 2, all of the light that enters the optical element lies in an optical path that is below the display pixel plane, avoiding any impact on the display image quality. In other arrangements, all or a portion of the folded optical path may lie above the display pixel plane, but may be made thin enough to minimize any impact on the display image quality.

A cover layer 214 is provided as part of the display to protect inner components of the sensor 200 such as the detector elements 202 and the display pixels 210. A top surface 216 of the cover layer 214 forms a sensing surface, which provides a contact area for the input object 212. It will be understood that the sensing surface 216 forms part of a sensing region in which an object may be imaged. As previously described, the sensing region may extend above the actual sensing surface 216. For simplicity, the cover layer 214 is shown as a single layer. However, the cover layer may include multiple cover layers or lenses, and may also include additional components such polarizers, color filters and the like, which vary depending on the type of display technology utilized.

Although generally described in the context of a fingerprint for illustrative purposes, the input object 212 is any object to be imaged. Generally, the object 212 will have various features. By way of example, the object 212 has ridges 218 and valleys 220. Due to their protruding nature, the ridges 218 contact the sensing surface 216. The valleys 220 do not contact the sensing surface 216 and instead form an air gap between the input object 212 and the sensing surface 216. These features may be optically imaged using direct illumination or by relying on principles of internal reflection.

In the embodiment shown, the detector elements 202 and the display pixels 204 are positioned above the blocking layer 204. The detector elements 202 are any suitable type of photo detector, which are configured to detect light from below. Examples of suitable detector elements are complementary metal oxide semiconductor (CMOS) and charge coupled device (CCD) sensor arrays. The detector elements 202 may be constructed as photoresistors or thin film photodetectors, such as thin film transistors (TFTs) or thin film photodiodes (e.g. pin or pn diodes). The display pixels 210 may be of any type used in typical display such as light emitting diodes (LEDs), organic LEDs (OLEDs), liquid crystal display (LCD), and the like. The display pixels may be active or passive. In certain embodiments, each of the display pixels 210 may be a display sub-pixel (e.g., red, green, blue) or may be an element of a pixel, such as a TFT. It will appreciated that although the detector elements 202 and display pixels 210 are shown in the same plane, the detector elements 202 and display pixels 210 may be positioned in different planes.

In certain embodiments, the display pixels 210 form a source of light, used to transmit light to the sensing surface 216, which is then reflected and detected by the detector elements 202 as described further below. However, it will be understood that a separate light source, such as light source 222 may be used in place of, or in combination with, the display pixels 210 to provide the source of light. Alternatively, as described further in connection with FIG. 3A, an LCD backlight may be used as the light source.

The blocking layer 204 defines the first set of apertures 224. The first set of apertures 224 are configured to permit the transmission of certain light reflected from the sensing surface into the transparent layer 206. The blocking layer 204 may be constructed of a light absorbing material, reflecting material or other material that occludes light from passing through areas other than through defined apertures, e.g. apertures 224. The blocking layer 204 may further define a second set of apertures 226 positioned below the detector elements 202, which apertures may further restrict the light reaching the detector elements 202.

The reflective layer 208 is positioned below the transparent layer 206 and includes reflective surfaces 212a and 212b (generally referenced as 212). The reflective surfaces 212 are configured to reflect light and may be constructed, for example, as mirrored surfaces. Although the reflective layer 208 is shown as having discrete reflective surfaces 212a and 212b, it will be understood that the reflective layer may include a continuous reflective surface. Non-reflective surface portions of the reflective layer 208 may be made of light absorbing material. Compared to using a continuous reflective surface, discrete reflective surfaces 212a and 212b (e.g., having light absorbing portions therebetween) can be used to reduce cross talk or stray light that may otherwise reach the detector elements through neighboring apertures. Alternatively, discrete reflective surfaces 212a and 212b may be used that have their widths adjusted to limit the angle of incoming light that is reflected to the corresponding detector element, as further described below.

In accordance with the disclosure, the detector elements 202 detect light, which is reflected from the sensing surface 216 and/or the input object 212, through the apertures 224 and transparent layer 206, which light is then further reflected off the reflective surfaces 212 of the reflecting layer 208. For example, some light transmitted into the cover layer 214 (e.g., from display pixels 210, a separate light source 222, and/or backlight (FIG. 3A)) will become incident on the input object 212. The incident light will in turn be reflected back towards to the blocking layer 204 at varying intensities. Some of the reflected light will be prevented from passing through the blocking layer 204, e.g., because the light is absorbed or reflected at layer 204 as shown by light ray 228. However, other reflected light will pass through the first set of apertures 224 and enter into the transparent layer 206, as shown by light rays 230 and 232.

With respect to light entering the transparent layer 206, some of the light may strike the reflective layer without striking a reflective surface, which light is simply absorbed by the reflective layer 208 provided the layer includes portions made of a light absorbing material. Other light entering the transparent layer 206 will strike one of the reflective surfaces 212a or 212b and will be reflected back up towards the blocking layer 204. Of the light reflected from the reflective surfaces 212, some will reach at least one of the detector elements, as shown by light ray 230. The amount of light reaching the detector elements 202 can be further limited by the second set of apertures 226 within the blocking layer as light striking the bottom of the blocking layer 208 will be absorbed, as shown by light ray 232.

In accordance with the arrangement described, the direction of light entering a given detector element 202 is restricted to an acceptance cone 234, 236, having a small acceptance angle θ as shown in FIG. 2 to prevent blurring of the image of the input object 212. The acceptance cone may, for example, be limited to a few degrees. In the example embodiment, acceptance cone 234 corresponds to detector element 202a whereas acceptance cone 236 corresponds to detector element 202b. The acceptance angle θ determines the degree of image blurring and the maximum distance from the detector elements 202 that the input object 212 can be located while still achieving a given image resolution. The size of the acceptance cones 234, 236 is dependent upon the width of the first 224 and second apertures 226, width of the reflective surfaces 212 and/or width of the photo detector surface of the detector elements 202 as further described in connection with FIG. 3B.

For purposes of illustration, only two detector elements 202a and 202b are shown, each with corresponding apertures and reflective surface defining acceptance cones 234 and 236, respectively. It will be appreciated that the sensor will have as many such detector elements as needed to image a desired area of the input object 212 and each detector element will have associated apertures and reflective surface to define an acceptance cone. Further, in the example, one detector element is shown for each pixel (which may comprise multiple sub-pixels) of the display. However, the detector element pitch need not match the display pixels pitch.

Figure 3A:
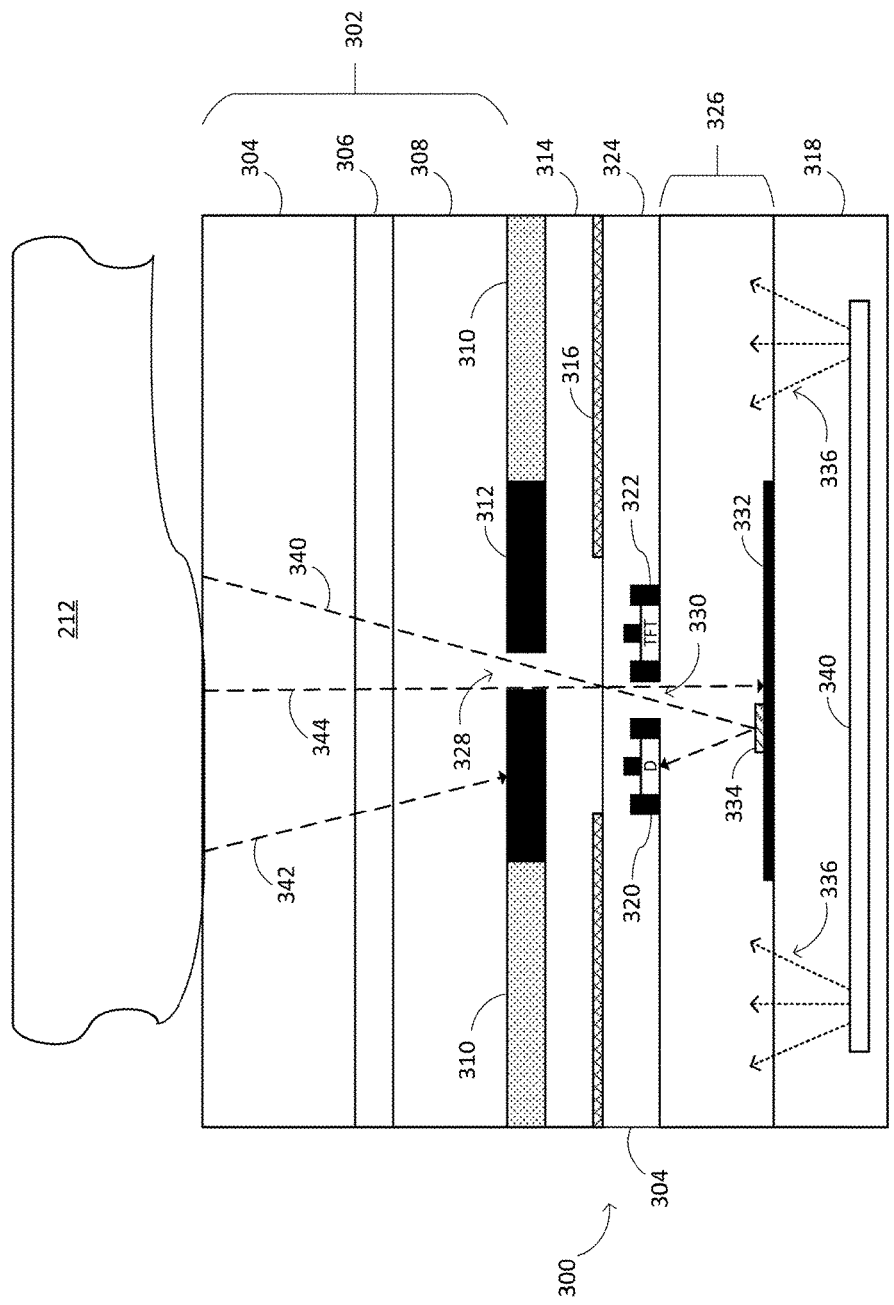
FIGS. 3A-3B illustrate an example of a sensor integrated in a display for imaging an input object, according to an embodiment

FIG. 3A illustrates an example of an optical sensor device 300 for imaging an object 212, which is formed as part of a LCD display according to an embodiment. As generally shown, the device includes a cover layer 302. The cover layer 302 may be divided into various components. By way of example only, the cover layer 302 may include a cover glass 304, polarizer 306, color filters glass 308, color filters 310, and black matrix 312. Other examples of components include liquid crystal 314, pixel electrodes 316, substrate glass 318, and backlight 340. It will be understood that the various layers are described with reference to an example of an LCD for the purpose of illustration and the actual layers used may differ without departing from the scope of the disclosure.

A detector element 320 and TFT 322 are part of a TFT layer 324 and are positioned above a transparent layer 326. Although only one detector element 320 and TFT 324 are shown, it will be understood that many such detector elements and TFTs will be present within a typical display having an integrated optical sensor. Disposed above the detector element 320 and TFT 322 is the black matrix 312, which generally forms a blocking layer. The blocking layer 312 is generally constructed of a light absorbing material, or other material to occlude light, except for apertures 328, which permit transmission of light. A second set of apertures 330 may be formed in the plane of the TFT layer 324, which apertures are formed from holes patterned in the metal layers (or other opaque features) in the TFT layer 324.

A reflective layer 332 having reflecting surface 334 is disposed generally below the transparent layer 326. The reflective layer 332 is patterned to permit light 336 from the display backlight 340 to be transmitted through the transparent layer 326, and clear portions of the TFT and liquid crystal layers where the blocking layer (black matrix) 312 does not shadow ITO pixel electrode 316 and liquid crystal. This allows the LCD backlight to be used as a light source in the optical imaging process. Thus, the reflective layer 332 performs a dual function of preventing light 336 from the LCD backlight from reaching the channels of any TFTs (and then increasing the TFT leakage currents) and preventing any stray light from reaching the detector element 320 which would reduce the detector element's sensitivity to light coming from the input object. The detector element 320 can be any suitable photo detector, such as for example, a photodiode implemented as a "photo TFT" which simply passes more current when illuminated.

The first set of apertures 328 are patterned in the blocking layer 312 in appropriate locations to permit light from the finger to pass through the blocking layer 312 and the second set of apertures 330, further through the transparent layer 326. The light is then reflected by the reflective surface 334 toward the underside of the detector element 320, as generally shown by light ray 340. Other light falling outside of the acceptance cone, such as light rays 342 and 344 are blocked by blocking layer 312 or non-reflective surfaces of reflective layer 332.

In FIG. 3A, the light source is the backlight 340 of the LCD display. However, as previously described, in other implementations, the primary light source that illuminates the input object 212 could be an "external" light source (such as one or more LEDs) that couples light directly into one of the layers above the TFT 322 and detector elements 320 such as the cover glass 304, for example. This type of external light source, shown by for example light source 220 in FIG. 2, permits other light sources (such as infrared or ultra-violet LEDs) and light distribution or illumination schemes to be used that improve the ridge/valley contrast or visibility of smaller fingerprint features, such as pours. Such sources may employ total internal light reflection in the cover glass or other some other layer to improve illumination efficiency and fingerprint feature contrast.

FIG. 3A shows a single detector element 320 paired with apertures 328 and 330 and reflective surface 334 for imaging a region of the input object 212. However, it will be understood that the sensor may include many such detector elements, each paired with apertures and reflective surfaces to image the input object 212.

Figure 3B:
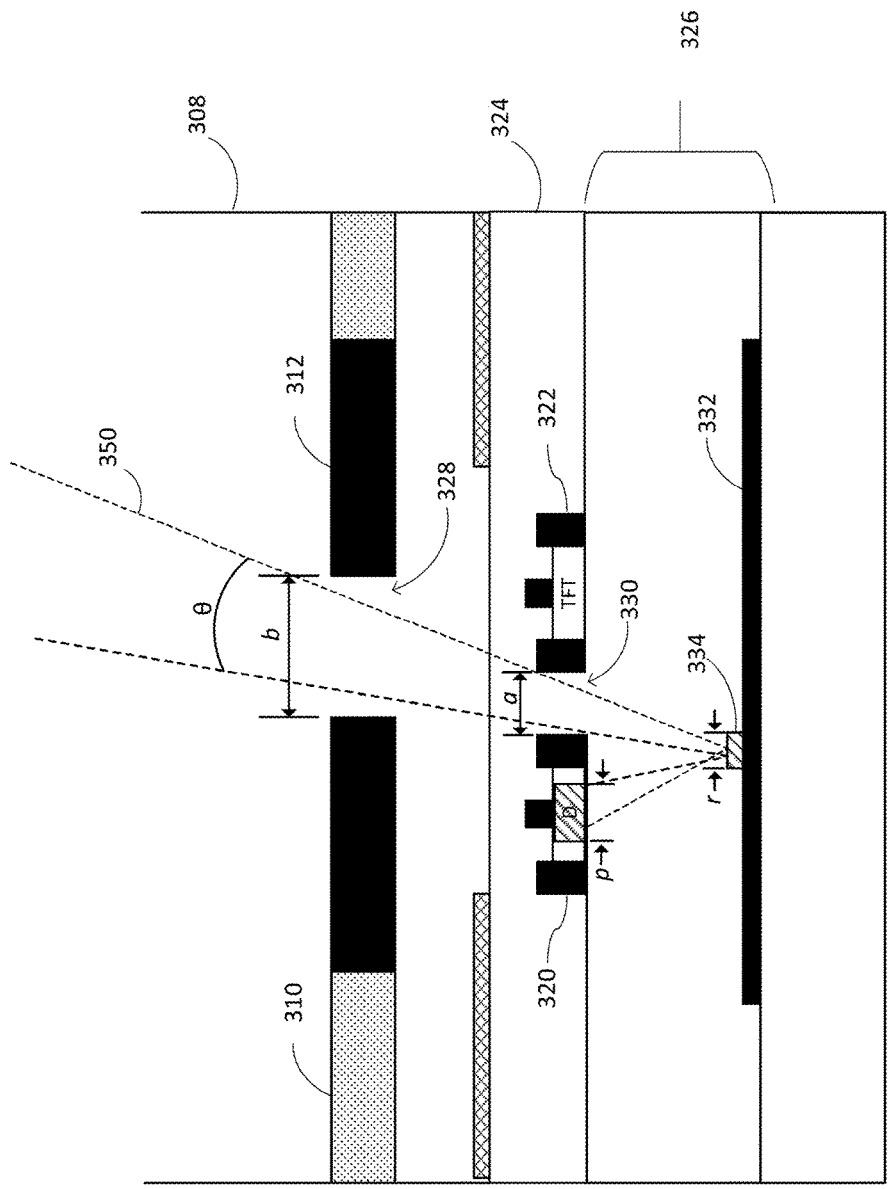

FIG. 3B illustrates the relationship between an acceptance cone 350 with an acceptance angle θ and various dimensions of optical sensor components in the context of the arrangement shown in FIG. 3A. Light 340 (FIG. 3A) reflecting off of the input object, which follows a path within the acceptance cone 350 will typically reach the detector element 328. The light acceptance angle θ can be defined and limited by the thickness of the transparent layer 314 as well as lateral dimensions depicted in FIG. 3B where:

| Dimension | Function |
| --- | --- |
| a | Width of the aperture 330 defined by opaque layers in the TFT layer 324. |
| b | Width of the apertures 328 in the blocking layer (black matrix) 312 above the liquid crystal layer. |
| p | Width of the photo-sensitive region of the detector element 320, or the TFT gate width and length in the case of a photo TFT detector element. |
| r | Width of the reflective surface 334 feature at the reflective surface 332 position at the bottom of the transparent layer 326. Although drawn above the reflective surface 332, the reflective surface 334 may also be recessed in the reflective layer 332 as described in connection with FIG. 9A-9B. |

Only the two most restrictive (narrowest or smallest width) features of the listed features (a, b, p, r) typically define the maximum light acceptance angle θ. Although it may be advantageous to select the light acceptance features as far from each other along the light path as possible, other combinations may be chosen. For example, choosing the b and p features to define the light acceptance angle θ will normally permit the smallest light acceptance angle to be obtained. But selecting the a and r or a and p feature sizes to define the light acceptance angle θ could be chosen to remove the need for a small features to be patterned in the blocking layer 312.

The light acceptance angle θ, and therefore the effectiveness of stray light rejection and ultimate imaging system resolution, is directly related to a light acceptance filter aspect ratio R, where R is equal to a ratio of a distance between the acceptance defining apertures along the path traveled by the light to the average of the two relevant aperture sizes. Therefore, the thickness of the transparent layer 326 should be sufficiently large to obtain the desired aspect ratio R for the chosen (or available) feature sizes that are used to define the aperture dimensions.

FIG. 4A-FIG. 8B illustrate various sensor arrangements including detector elements, transparent layers, blocking layers and apertures which may be employed according to the disclosure along with illustrative steps for making and assembling them. Although the steps are described in a particular sequence, the sequence may be altered and/or steps may be combined or eliminated without departing from the scope of the disclosure except where otherwise apparent. Although display circuitry is not shown in the figures, in embodiments where the sensor arrangement is integrated in a display, the detector elements may be formed in the same plane as the display backplane using a thin film process.

Figure 4B:
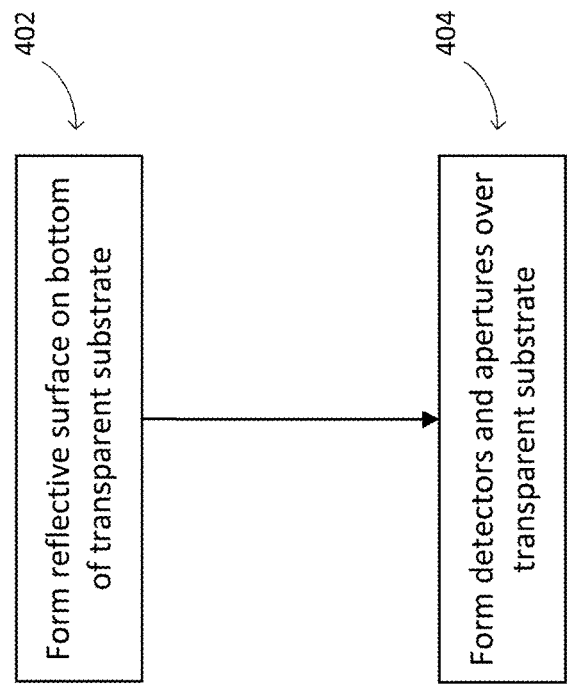
FIGS. 4A-4B illustrate a method of making and an arrangement of a sensor stack, according to an embodiment.
Figure 4A:
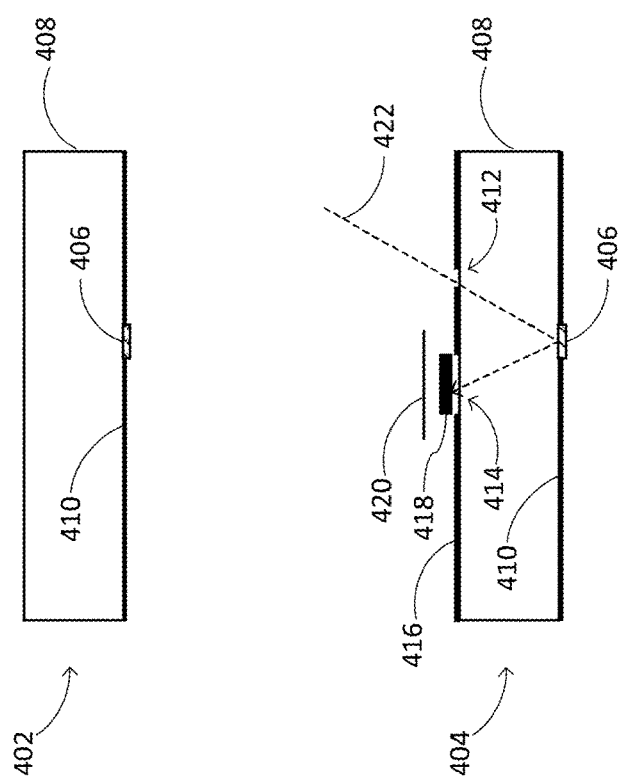

Referring to FIGS. 4A-4B, as shown in step 402, a reflective surface (e.g., mirror) 406 is formed on one side (bottom) of a transparent substrate 408. The reflective surface 406 may be formed on the bottom of the substrate 408 through deposition and patterning of reflective material. The bottom of the transparent substrate 408 may optionally be coated with a light absorbing material 410. Alternatively, a light absorbing material 410 with patterned holes may first be applied to the backside followed by deposition of the reflective surfaces 406.

In step 404, apertures 412 and apertures 414 are further defined in a light absorbing layer 416 under the detector element 418 on the other side (top side) of the substrate 408 to allow entry of incoming light. The absorbing layer 416 may be fabricated before mounting the detector elements 418 or vice versa. An optional light shield layer 420 may also be fabricated above the detector elements 418. The light shield layer 420 protects the detector element 418 from being exposed to light from above. In this configuration, the substrate 408 acts as the transparent layer between the apertures 412, 414 and the reflective surfaces 406. In the arrangement shown, light reaching the detector element 418 generally follows the path shown by light ray 422.

Figure 5B:
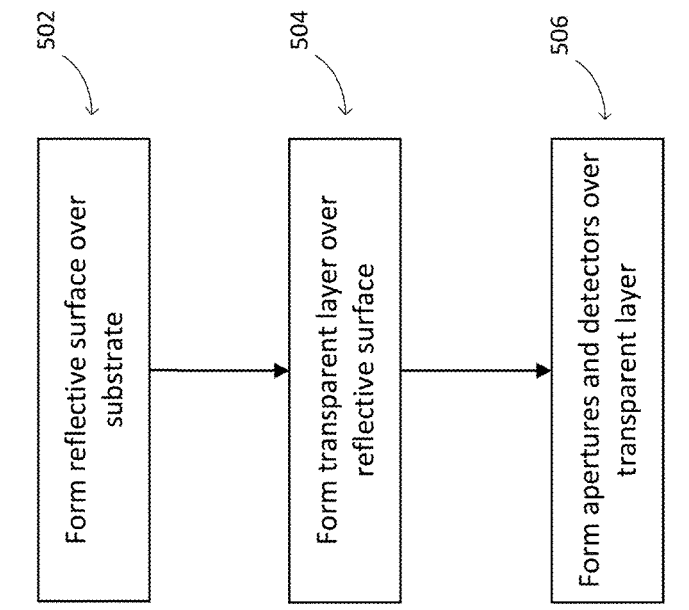
FIGS. 5A-5B illustrate a method of making and an arrangement of a sensor stack, according to an embodiment.
Figure 5A:
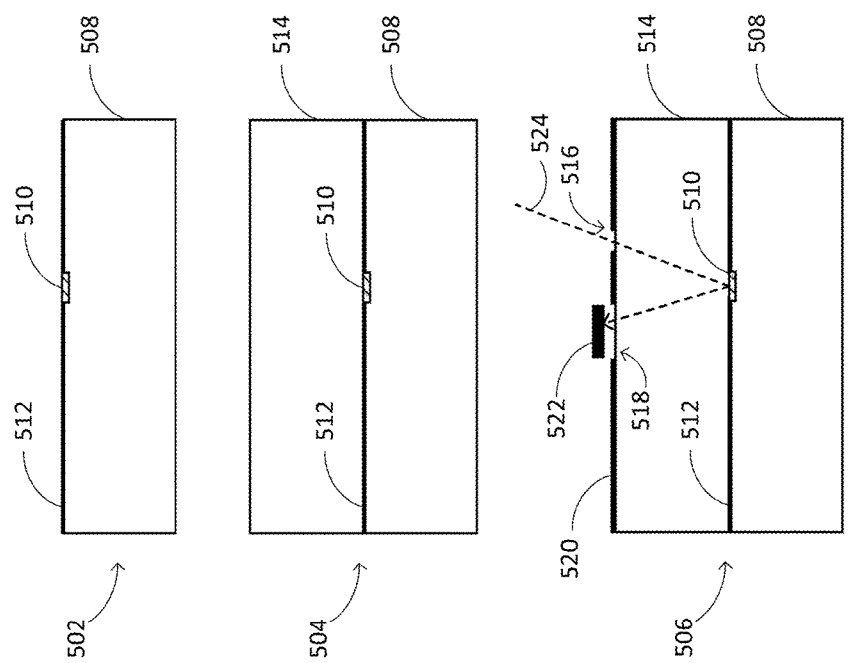

FIGS. 5A-5B illustrate an additional embodiment employing a separate substrate 508 and transparent layer 514. In step 502, the substrate 508 is coated with a first light reflecting layer 512 having reflective surfaces 510. The reflective surfaces 510 (e.g., mirrors) may be defined by patterning the light reflecting layer 512 with reflective material or through openings defined in an optional light absorbing layer deposited over the reflective layer as described in connection with FIGS. 4A-4B.

In step 504, a transparent layer 514 is coated over substrate 508. In step 506, apertures 516 are formed for incoming light and apertures 518 are formed for the detector elements through a second light absorbing layer 520. A backplane is constructed that includes the detector elements 522. The detector elements may also be shielded from direct light using a light absorbing or light reflecting layer over the detector (see FIG. 4A). In the arrangement shown, light reaching the detector element 522 generally follows the path shown by light ray 524.

Figure 6A:
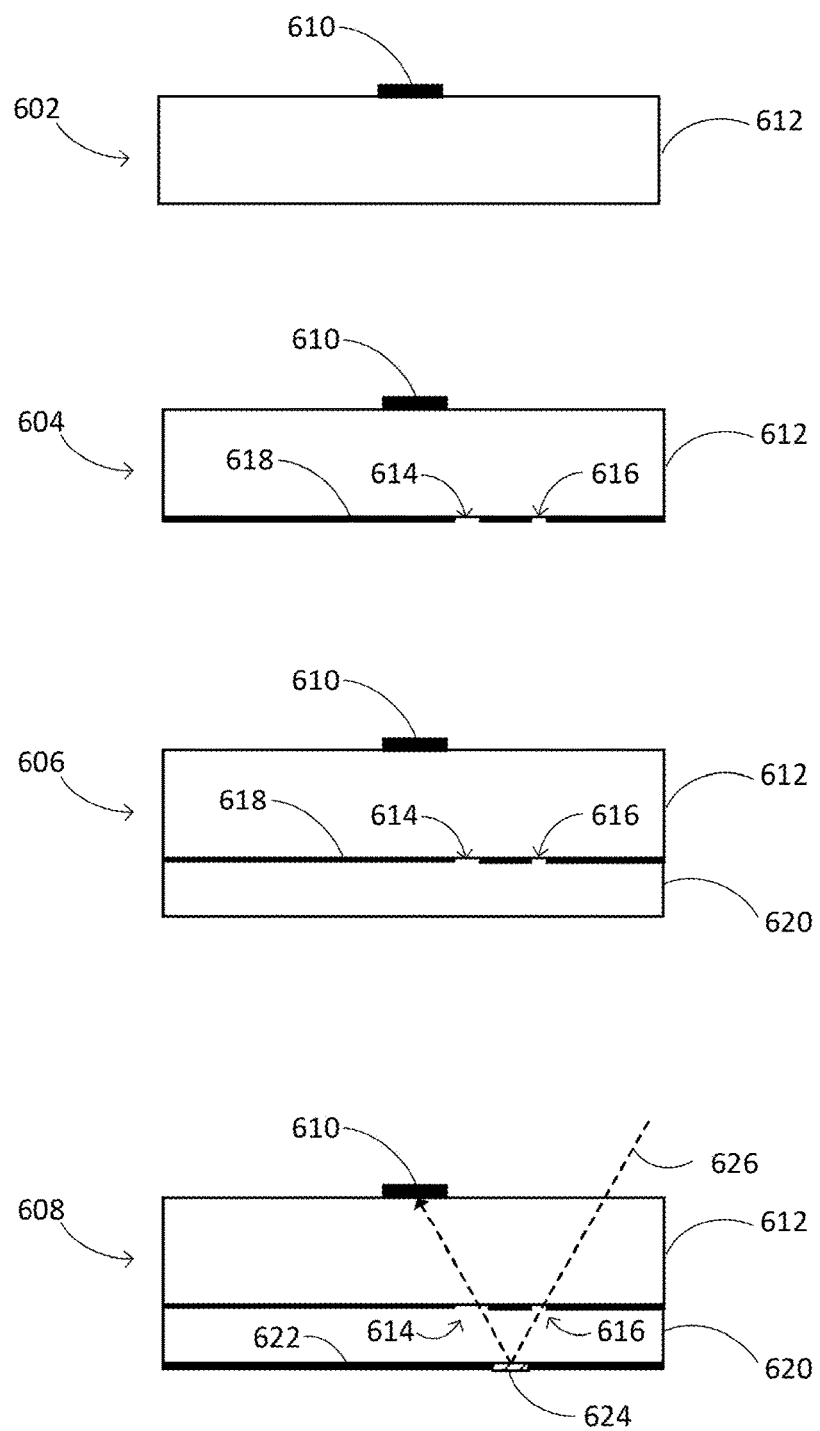
FIGS. 6A-6B illustrate a method of making and an arrangement of a sensor stack, according to an embodiment.
Figure 6B:
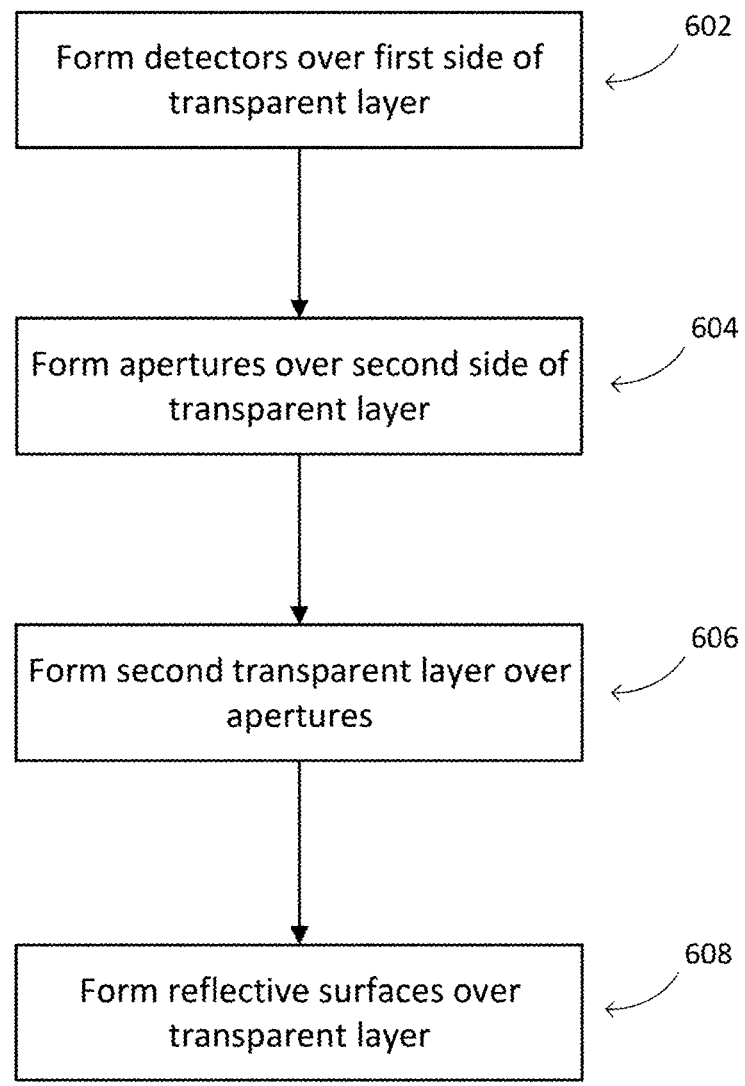

FIGS. 6A and 6B illustrate yet another embodiment. In step 602, detector elements 610 are formed on a first side (top side) of a first transparent substrate 612. In step 604, first 614 and second 616 apertures are formed on a second side (bottom side) of the transparent layer. The first and second apertures may be defined in a light absorbing layer 618.

In step 606, a second transparent layer 620 is formed over the first 614 and second 616 apertures and the light absorbing layer 618. In step 608, a reflective layer 622 having reflective surfaces 624 is formed on the bottom side of the second transparent layer 620. The reflective layer may optionally include a light absorbing material and may be formed as previously described in connection with FIGS. 4A-4B. The detector elements may also be shielded from direct light using a light absorbing or light reflecting layer over the detector (see FIG. 4A). In the arrangement shown, light reaching the detector element 610 generally follows the path shown by light ray 626.

Figure 7A:
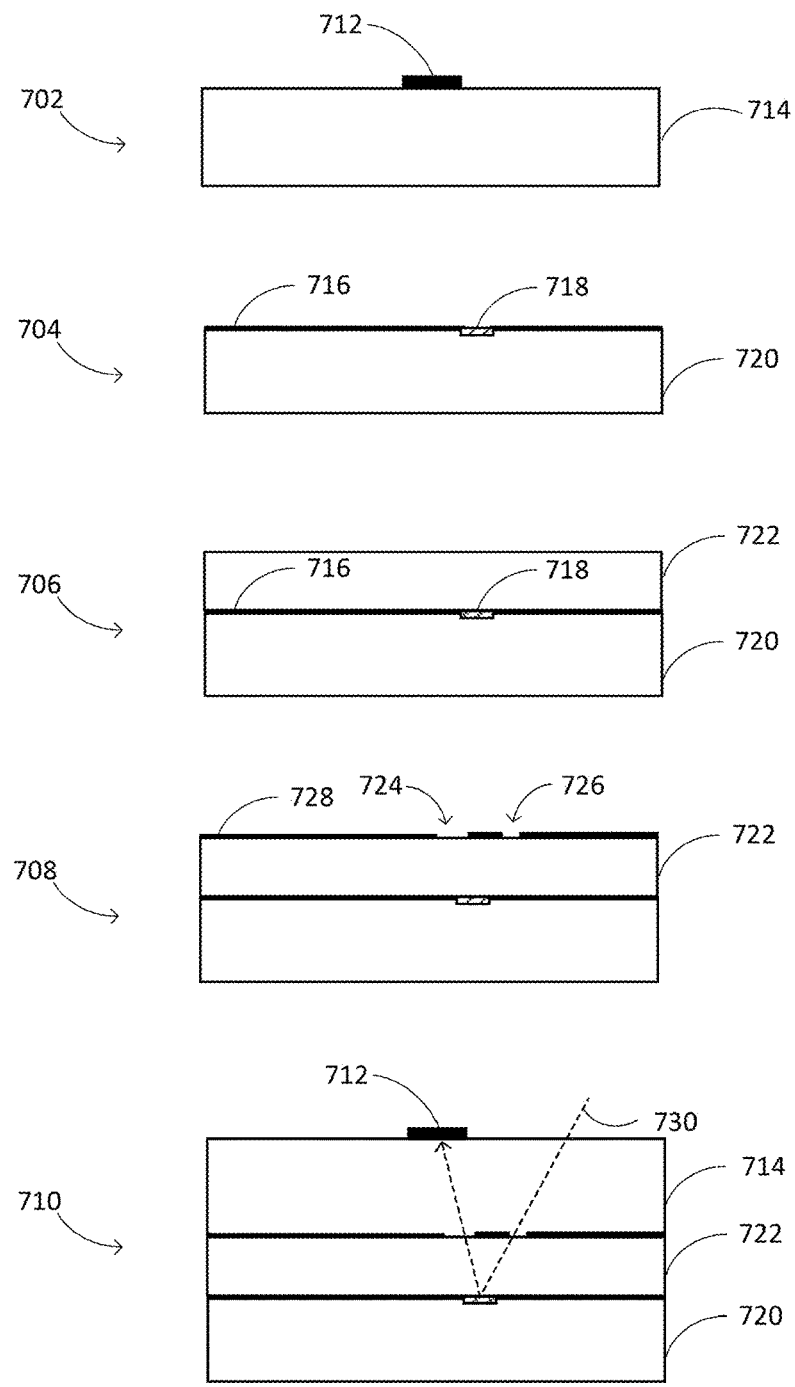
FIGS. 7A-7B illustrate a method of making and an arrangement of a sensor stack, according to an embodiment.
Figure 7B:
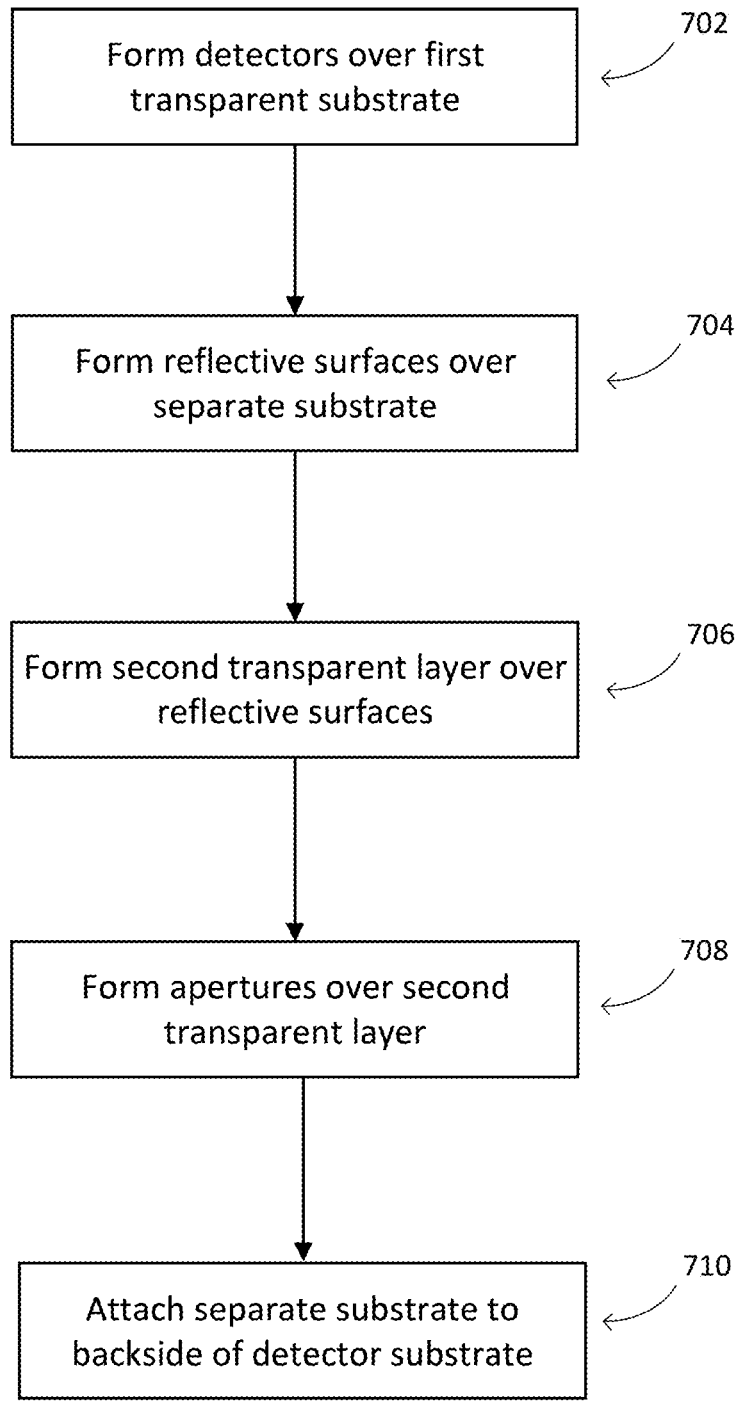

FIGS. 7A and 7B illustrate yet another embodiment. In step 702, the detector elements 712 are formed over a first transparent substrate 714.

In step 704, reflective layer 716 having reflective surfaces 718 are formed over a separate substrate 720. The reflective layer 716 may optionally include a light absorbing material and may be formed as previously described in connection with FIGS. 4A-4B.

In step 706, a second transparent layer 722 is formed over the reflective layer 716. In step 708, first 724 and second 726 apertures are formed over the transparent layer 722. The first and second apertures may be formed with, for example, holes in a second light absorbing layer 728.

In step 710, the assemblies formed from steps 702-708 are attached as shown using any suitable means. The detector elements may also be shielded from direct light using a light absorbing or light reflecting layer over the detector (see FIG. 4A). In the arrangement shown, light reaching the detector element 712 generally follows the path shown by light ray 730.

Figures 8A, 8B:
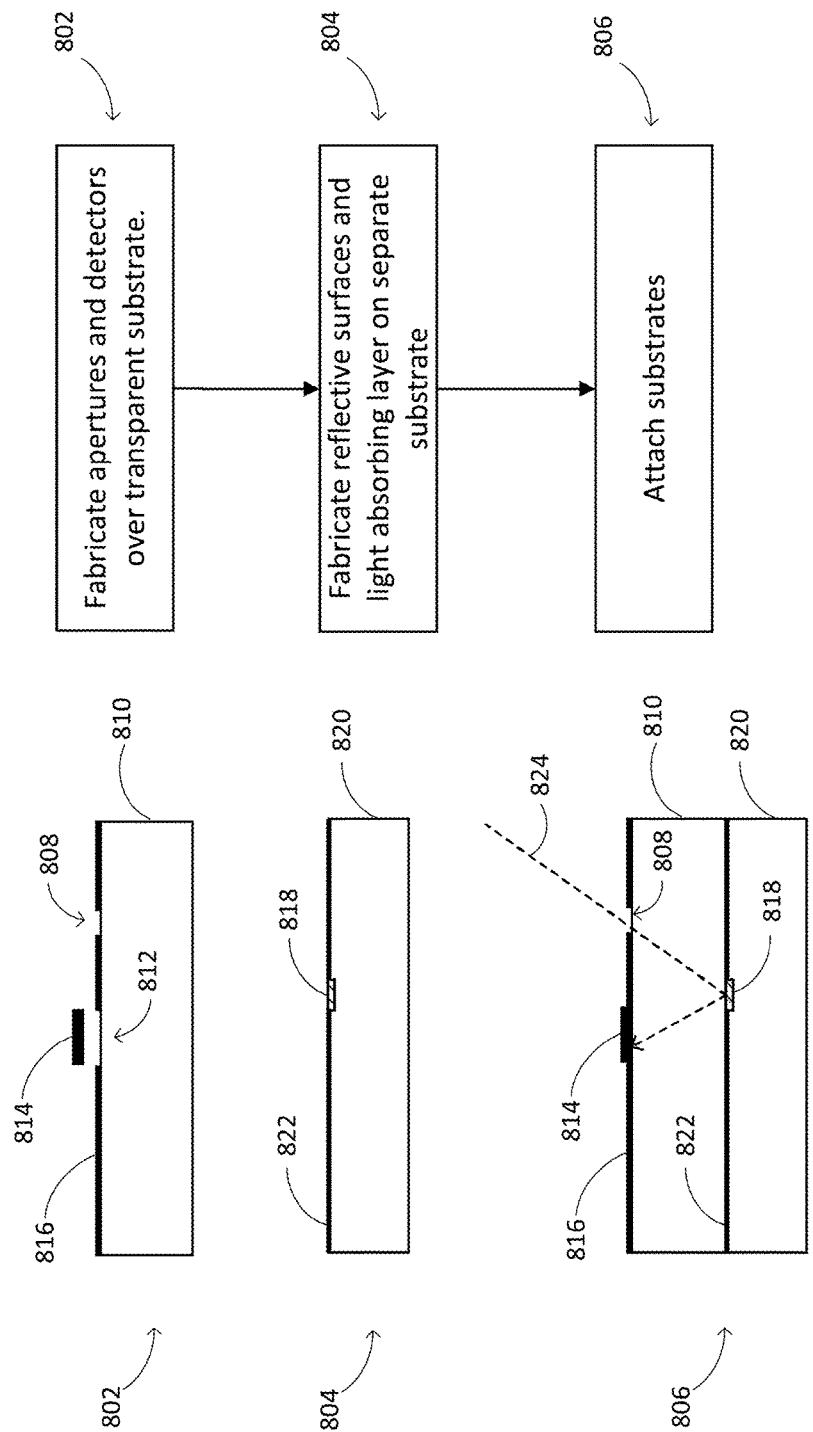
FIGS. 8A-8B illustrate a method of making and an arrangement of a sensor stack, according to an embodiment.

FIGS. 8A and 8B illustrate yet another embodiment. In step 802, apertures 808 are defined on one side (top side) of a transparent substrate 810 to allow entry of incoming light. Apertures 812 are further defined under detector element 814 on the top side of the substrate 810. The apertures 808 and 812 may be formed as holes in a light absorbing layer 816. The absorbing layer 816 may be fabricated before adding the detector elements 814 or vice versa. The detector elements may also be shielded from direct light using a light absorbing or light reflecting layer over the detector (see FIG. 4A).

In step 804, a reflective surface (e.g., mirror) 818 is formed on one side (top side) of a substrate 820. As previously described, the reflective surfaces 818 may be formed by deposition and patterning of reflective material. The top side may be optionally coated with a light absorbing material 822. Alternatively, a light absorbing material 822 with patterned holes may first be applied followed by deposition of the reflective surfaces 816.

In step 806, the assemblies formed by the transparent substrate 810 and substrate 820 are attached using any suitable means as shown. In the arrangement shown, light reaching the detector element 814 generally follows the path shown by light ray 824.

Stray light is any light reaching a particular detector element which does not come from the acceptance cone corresponding to that detector element. FIG. 9A and FIG. 9B illustrates examples of a reflective layer 900 that may be used in embodiments to reduce the noise caused by stray light arriving at the detector element. The acceptance angle θ of an acceptance cone 902 corresponding to a reflective surface 904 can be constricted by forming a reflective layer 900 having a reflective surface 904 (e.g., mirror) below a top surface 908 of a light absorbing layer 906. The reflective layer 900 only reflects the light that passes within the acceptance cone 902. The light acceptance cone 902 (and hence light acceptance angle θ) can be adjusted by controlling the position of the reflective surface 904 with respect to the top surface 908 of the absorbing layer 906 of the light reflective layer 900.

As shown, the light absorbing layer 906 can be coated directly on top of the reflective surface 904 as shown in FIG. 9A. Alternatively, the light absorbing layer 906 can be coated over a transparent layer 910, which covers the surface of the mirror 904 as shown in FIG. 9B.

The reflective surfaces 900 will reflect light, such as light ray 912, from within the acceptance cone 902 back up towards the detector elements (not shown). However, light reaching the mirror from angles falling outside of the acceptance cone 902, such as light rays 914, are blocked by the light absorbing layer 906.

In illustrating the various embodiments, examples have been shown where the pitch size of the detector elements is generally the same as the pitch size of the display elements. However, it will be understood that the pitch of the detector elements and display elements may be different. In addition, it will be understood that the arrangement of apertures and/or detector pixels may be staggered throughout a display to the further reduce the possibility of noise reaching the detector elements. Detector elements that are susceptible to receiving stray light or noise may be eliminated for simply not used during the imaging process.

It will further be understood that arrangement has generally been described in the context of a sensor for biometric imaging. However, the sensor described herein can also be used as a touch sensor.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An optical sensor for imaging a biometric input object on a sensing region, comprising:
   a transparent layer having a first side and a second side opposite the first side;
   a first set of apertures disposed above the first side of the transparent layer;
   a reflective layer disposed below the second side of the transparent layer configured to receive light transmitted through the first set of apertures and to reflect the received light; and
   a plurality of detector elements positioned to detect the reflected light, wherein the plurality of detector elements have a top side facing the sensing region and an underside opposite to the sensing region, wherein the plurality of detector elements are configured to detect the reflected light from the underside opposite to the sensing region.

2. The optical sensor of claim 1, wherein the plurality of detector elements are positioned above the transparent layer.

3. The optical sensor of claim 1, wherein the first set of apertures are defined by openings in a blocking layer configured to occlude light in areas proximate to the openings.

4. The optical sensor of claim 3, wherein the blocking layer comprises a light absorbing material.

5. The optical sensor of claim 1, wherein the reflective layer comprises a set of mirrored surfaces, each of the mirrored surfaces being surrounded by a light absorbing material.

6. The optical sensor of claim 5, wherein the mirrored surfaces are recessed relative to a surface of the light absorbing material.

7. The optical sensor of claim 6, wherein the reflective layer comprises a second transparent layer, wherein the mirrored surfaces are positioned on a first side of the second transparent layer and the light absorbing material is positioned on a second side of the second transparent layer opposite the first side.

8. The optical sensor of claim 1, further comprising:
   a second set of apertures disposed above the first side of the transparent layer and positioned between the plurality of detector elements and the reflective layer.

9. The optical sensor of claim 1, wherein the first set of apertures is disposed between the plurality of detector elements and the sensing region.

10. The optical sensor of claim 1, further comprising:
    a liquid crystal display (LCD) backlight which forms a light source configured to provide the light detected by the plurality of detector elements; and
    a light shielding layer disposed between the backlight and the plurality of detector elements, wherein the light shielding layer blocks a portion of the light provided by the LCD backlight.

11. The optical sensor of claim 1, further comprising a light shield layer above the plurality of detector elements.

12. A display for imaging a biometric input object, comprising:
    a set of display pixels;
    a light blocking layer having a first set of apertures;
    a transparent layer positioned below the display pixels and the first set of apertures;
    a reflective layer positioned below the transparent layer configured to receive light transmitted through the first set of apertures and to reflect the received light; and
    a set of detector elements positioned to detect the reflected light.

13. The display of claim 12, wherein the display comprises an organic light-emitting diode (OLED) display and one or more of display pixels form a light source configured to provide the light detected by the set of detector elements.

14. The display of claim 12, wherein the display comprises a liquid crystal display (LCD) backlight forming a light source configured to provide the light detected by the set of detector elements.

15. The display of claim 14, wherein first portions of the reflective layer are transparent to permit transmission of light from the backlight and second portions of the reflective layer are configured to block the transmission of light from the backlight.

16. The display of claim 12, further comprising:
    a second set of apertures disposed between the set of detector elements and the reflective layer.

17. The display of claim 12, wherein the reflective layer comprises a set of mirrored surfaces, each of the mirrored surfaces being surrounded by light absorbing material.

18. The display of claim 12, further comprising a light shield layer above the set of detector elements.

19. A method for making an optical fingerprint sensor, comprising:
    forming a light blocking layer above a first side of a first transparent layer, the light blocking layer having a first set of apertures configured to permit transmission of light therethrough;
    forming a reflective layer below a second side of the first transparent layer opposite to the first side of the first transparent layer, the reflective layer positioned to reflect the light transmitted through the first set of apertures; and
    forming a detector layer having a plurality of detector elements positioned to receive the light transmitted through the first set of apertures and reflected from the reflective layer,
    wherein forming the reflective layer comprises forming a set of discrete mirrored surfaces and a light absorbing material in areas between the discrete mirrored surfaces, wherein each of the discrete mirrored surfaces is positioned to receive light transmitted through a corresponding aperture in the first set of apertures.

20. The method of claim 19, wherein forming the reflective layer comprises:
    patterning a reflective material to form a the set of discrete mirrored surfaces positioned to receive the light transmitted through the first set of apertures.

21. The method of claim 19, wherein forming the reflective layer comprises:
    depositing a continuous reflective material; and
    after depositing the continuous reflective material, depositing a light absorbing material over selected portions of the continuous reflective material to form the set of discrete mirrored surfaces exposed through the light absorbing material, wherein the set of discrete mirrored surfaces are positioned to receive the light transmitted through the first set of apertures.

22. The method of claim 19, wherein the first transparent layer is a first substrate having a first side and a second side opposite to the first side, and wherein the detector layer is formed directly on the first side of the first substrate.

23. The method of claim 19, further comprising:
    forming the first transparent layer by applying a transparent material to a first side of a first substrate.

* * * * *

UNITED STATES PATENT AND TRADEMARK OFFICE
CERTIFICATE OF CORRECTION

PATENT NO. : 10,176,355 B2
APPLICATION NO. : 15/087955
DATED : January 8, 2019
INVENTOR(S) : Patrick Smith et al.

Page 1 of 1

It is certified that error appears in the above-identified patent and that said Letters Patent is hereby corrected as shown below:

In the Claims

Column 18, Claim 20, Line 3: delete "form a the" and insert --form the--.

Signed and Sealed this
Twelfth Day of March, 2019

Andrei Iancu
*Director of the United States Patent and Trademark Office*